(12) United States Patent
Sun et al.

(10) Patent No.: US 11,294,455 B2
(45) Date of Patent: Apr. 5, 2022

(54) METHOD AND DEVICE FOR DETERMINING GAZE PLACEMENT, COMPUTER READABLE STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jiankang Sun, Beijing (CN); Hao Zhang, Beijing (CN); Lili Chen, Beijing (CN); Minglei Chu, Beijing (CN); Jian Sun, Beijing (CN); Ziqiang Guo, Beijing (CN); Guixin Yan, Beijing (CN); Yakun Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 652 days.

(21) Appl. No.: 16/305,882

(22) PCT Filed: Jan. 30, 2018

(86) PCT No.: PCT/CN2018/074537
§ 371 (c)(1),
(2) Date: Nov. 29, 2018

(87) PCT Pub. No.: WO2019/010959
PCT Pub. Date: Jan. 17, 2019

(65) Prior Publication Data
US 2021/0223859 A1 Jul. 22, 2021

(30) Foreign Application Priority Data
Jul. 10, 2017 (CN) .......................... 201710558905.4

(51) Int. Cl.
*G06F 3/01* (2006.01)
*G06K 9/00* (2006.01)
(Continued)

(52) U.S. Cl.
CPC .............. *G06F 3/013* (2013.01); *G06F 3/012* (2013.01); *G06F 17/11* (2013.01); *G06K 9/0061* (2013.01);
(Continued)

(58) Field of Classification Search
CPC ... G06F 3/013; G06K 9/00604; G06K 9/0061
See application file for complete search history.

(56) References Cited

U.S. PATENT DOCUMENTS 5,231,674 A * 7/1993 Cleveland .............. A61B 3/113
351/210
8,077,914 B1 * 12/2011 Kaplan ................... G06F 3/013
382/103
(Continued)

FOREIGN PATENT DOCUMENTS

CN 201477518 U 5/2010
CN 101866215 A 10/2010
(Continued)

OTHER PUBLICATIONS

Z. R. Cherif, et al., "An adaptive calibration of an infrared light device used for gaze tracking," IMTC/2002. Proceedings of the 19th IEEE Instrumentation and Measurement Technology Conference (IEEE Cat. No.00CH37276), 2002, pp. 1029-1033 vol. 2, doi: 10.1109/IMTC.200 (Year: 2002).*
(Continued)

*Primary Examiner* — Michael Robert Cammarata
(74) *Attorney, Agent, or Firm* — Kinney & Lange, P.A.

(57) ABSTRACT

Embodiments of the present disclosure provide a method and a device for determining a gaze placement and a computer readable storage medium. The method comprises acquiring an ocular image of a subject; determining at least one gaze characteristic vector based on an ocular image; determining a gaze placement of the subject, according to a
(Continued)

gaze estimation model and the at least one characteristic vector. The characteristic vector comprises at least one of: a first characteristic vector from a first reference speckle center to a pupil center, wherein the first reference speckle is formed by a first reference source in the ocular image; a second characteristic vector from the pupil center to a second reference speckle center, wherein the second reference speckle is formed by a second reference source in the ocular image; a third characteristic vector from the second reference speckle center to the first reference speckle center.

16 Claims, 7 Drawing Sheets

(51) Int. Cl.
*G06T 7/70* (2017.01)
*G06F 17/11* (2006.01)
*G06K 9/52* (2006.01)
*G06K 9/62* (2006.01)
*G06T 7/60* (2017.01)

(52) U.S. Cl.
CPC .......... *G06K 9/00604* (2013.01); *G06K 9/52* (2013.01); *G06K 9/6269* (2013.01); *G06T 7/60* (2013.01); *G06T 7/70* (2017.01)

(56) References Cited

U.S. PATENT DOCUMENTS

| | | | | |
|---|---|---|---|---|
| 8,457,352 B2* | 6/2013 | Hennessey | ......... | G06K 9/00604 382/103 |
| 8,824,779 B1* | 9/2014 | Smyth | ..................... | G06T 7/593 382/154 |
| 8,878,749 B1* | 11/2014 | Wu | ......................... | G01S 17/06 345/8 |
| 8,944,600 B2* | 2/2015 | Blixt | ...................... | A61B 3/113 351/209 |
| 8,971,570 B1* | 3/2015 | Raffle | ..................... | G06F 3/013 382/103 |
| 9,727,130 B2* | 8/2017 | Onuki | .................... | G06F 1/3209 |
| 2004/0174496 A1* | 9/2004 | Ji | ............................ | G06F 3/013 351/209 |
| 2005/0175218 A1* | 8/2005 | Vertegaal | ............... | A61B 3/113 382/103 |
| 2006/0110008 A1* | 5/2006 | Vertegaal | ................ | G06T 7/251 382/103 |
| 2006/0239670 A1* | 10/2006 | Cleveland | ............... | G06F 3/013 396/51 |
| 2011/0228975 A1* | 9/2011 | Hennessey | ......... | G06K 9/00624 382/103 |
| 2013/0083976 A1* | 4/2013 | Ragland | ................. | A61B 3/113 382/117 |
| 2013/0188834 A1* | 7/2013 | Ebisawa | ................ | A61B 3/113 382/103 |
| 2013/0329957 A1* | 12/2013 | Ebisawa | ................ | A61B 3/113 382/103 |
| 2014/0211995 A1* | 7/2014 | Model | ..................... | G06F 3/013 382/103 |
| 2015/0109204 A1* | 4/2015 | Li | .......................... | G06F 3/011 345/156 |
| 2015/0160726 A1* | 6/2015 | Sullivan | ............. | G02B 27/0093 345/156 |
| 2015/0278599 A1* | 10/2015 | Zhang | ................ | G06K 9/00604 348/78 |
| 2016/0007849 A1* | 1/2016 | Krueger | ................. | A61B 5/398 600/301 |
| 2017/0031437 A1 | 2/2017 | Qian et al. | | |
| 2017/0278269 A1* | 9/2017 | Ebisawa | ............ | G06K 9/00255 |
| 2019/0156100 A1* | 5/2019 | Rougeaux | ............... | G06F 3/013 |
| 2019/0172222 A1* | 6/2019 | Ebisawa | ................ | A61B 3/113 |
| 2020/0214559 A1* | 7/2020 | Krueger | ................. | A42B 3/046 |

FOREIGN PATENT DOCUMENTS

| | | |
|---|---|---|
| CN | 102125422 A | 7/2011 |
| CN | 102930252 A | 2/2013 |
| CN | 103761519 A | 4/2014 |
| CN | 104951084 A | 9/2015 |
| CN | 105138965 A | 12/2015 |
| CN | 107357429 A | 11/2017 |

OTHER PUBLICATIONS

Zhiwei Zhu, Qiang Ji and K. P. Bennett, "Nonlinear Eye Gaze Mapping Function Estimation via Support Vector Regression," 18th International Conference on Pattern Recognition (ICPR'06), 2006, pp. 1132-1135, doi: 10.1109/ICPR.2006.864. (Year: 2006).*
Blignaut, P. (2013). Mapping the Pupil-Glint Vector to Gaze Coordinates in a Simple Video-Based Eye Tracker. Journal of Eye Movement Research, 7(1). https://doi.org/10.16910/jemr.7.1.4 (Year: 2013).*
A. Kar and P. Corcoran, "A Review and Analysis of Eye-Gaze Estimation Systems, Algorithms and Performance Evaluation Methods in Consumer Platforms," in IEEE Access, vol. 5, pp. 16495-16519, 2017, doi: 10.1109/ACCESS.2017.2735633. (Year: 2017).*
J. J. Cerrolaza, A. Villanueva, and R. Cabeza, "Taxonomic study of polynomial regressions applied to the calibration of video-oculographic systems," in Proc. 2008 Symp. Eye Tracking Res. Appl. NewYork: ACM, pp. 259-266. (Year: 2008).*
C. A. Hennessey and P. D. Lawrence, "Improving the Accuracy and Reliability of Remote System-Calibration-Free Eye-Gaze Tracking," in IEEE Transactions on Biomedical Engineering, vol. 56, No. 7, pp. 1891-1900, Jul. 2009, doi: 10.1109/TBME.2009.2015955. (Year: 2009).*
Zhiwei Zhu and Qiang Ji, "Eye gaze tracking under natural head movements," 2005 IEEE Computer Society Conference on Computer Vision and Pattern Recognition (CVPR'05), 2005, pp. 918-923 vol. 1, doi: 10.1109/CVPR.2005.148. (Year: 2005).*
E. D. Guestrin and M. Eizenman, "General theory of remote gaze estimation using the pupil center and corneal reflections," in IEEE Transactions on Biomedical Engineering, vol. 53, No. 6, pp. 1124-1133, Jun. 2006, doi: 10.1109/TBME.2005.863952. (Year: 2006).*
International Search Report and English Translation of Box V of the Written Opinion dated May 9, 2018, received for corresponding Chinese Application No. PCT/CN2018/074537.
Second Chinese Office Action dated Jul. 23, 2019, received for corresponding Chinese Application No. 201710558905.4.

* cited by examiner

METHOD AND DEVICE FOR DETERMINING GAZE PLACEMENT, COMPUTER READABLE STORAGE MEDIUM

CROSS-REFERENCE TO RELATED APPLICATION(S)

This application is a Section 371 National Stage Application of International Application No. PCT/CN2018/074537 filed on Jan. 30, 2018, which claims the priority of Chinese Patent Application No. 201710558905.4 filed on Jul. 10, 2017, the entire contents of which are hereby incorporated by reference.

TECHNICAL FIELD

Embodiments of the present invention relate to the field of human-computer interaction, more specifically, to a method and a device for determining a gaze placement and a computer readable storage medium.

BACKGROUND

Gaze estimation techniques (sometimes referred to as eye tracking techniques) are techniques used to determine a gaze placement of a human or an animal. A gaze estimation technique uses a touch-type device, for example, a specially designed contact lens to determine the gaze, so that the direction of the gaze can be determined based on the contact lens which moves with the eye. In addition, another type of gaze estimation technique uses a camera to capture an eye image of a subject, then perform eye feature extraction, measure the movement of the eye, and finally estimate the direction of the gaze or the gaze placement.

SUMMARY

According to a first aspect of the disclosure, there is provided a method for determining a gaze placement, comprising: obtaining an ocular image of a subject; determining at least one gaze characteristic vector based on the ocular image; and determining a gaze placement of the subject, according to a gaze estimation model and the at least one characteristic vector.

For example, the at least one characteristic vector comprises at least one of: a first characteristic vector indicating a vector from a center of a first reference speckle to a center of a pupil, wherein the first reference speckle is formed by a first reference source in the ocular image; a second characteristic vector indicating a vector from the center of the pupil to a center of a second reference speckle, wherein the second reference speckle is formed by a second reference source in the ocular image; and a third characteristic vector indicating a vector from the center of the second reference speckle to the center of the first reference speckle.

For another example, the determining the at least one gaze characteristic vector based on the ocular image comprises: fitting a pupil portion of the ocular image into an ellipse, so as to determine at least one of: a center of the ellipse, being used as the center of the pupil; a major axis of the ellipse; a minor axis of the ellipse; and a rotation angle of the major axis with respect to a horizontal direction. For another example, the ocular image is obtained by using a ring-like reference source as an illumination source. For another example, the gaze estimation model is established by following formulas:

$$x_{fix}=a_0+a_1 \cdot x_{AI}+a_2 \cdot x_{IB}+a_3 \cdot x_{BA}+a_4 \cdot x_{AI} \cdot x_{IB}+a_5 \cdot x_{AI} \cdot x_{BA}+a_6 \cdot x_{IB} \cdot x_{BA}+a_7 \cdot x_{AI}^2+a_8 \cdot x_{IB}^2+a_9 \cdot x_{BA}^2$$

$$y_{fix}=b_0+b_1 \cdot y_{AI}+b_2 \cdot y_{IB}+b_3 \cdot y_{BA}+b_4 \cdot y_{AI} \cdot y_{IB}+b_5 \cdot y_{AI} \cdot y_{BA}+b_6 \cdot y_{IB} \cdot y_{BA}+b_7 \cdot y_{AI}^2+b_8 \cdot y_{IB}^2+b_9 \cdot y_{BA}^2$$

wherein $a_i$ and $b_j$ are model parameters, $i=0, \ldots, 9$ and $j=0, \ldots, 9$; $x_{fix}$ and $y_{fix}$ are coordinates of the gaze placement corresponding to the ocular image on the X-axis and the Y-axis of an observation object coordinate system respectively; $x_{AI}$ and $y_{AI}$ are components of the first characteristic vector on the X-axis and Y-axis of an ocular image coordinate system respectively; $x_{AI}$ and $y_{IB}$ are components of the second characteristic vector on the X-axis and Y-axis of the ocular image coordinate system respectively; and $x_{BA}$ and $y_{BA}$ are components of the third characteristic vector on the X-axis and Y-axis of the ocular image coordinate system respectively.

For another example, the model parameters of the gaze estimation model are determined by using least squares, and at least 10 calibration points are used.

For another example, the determining the gaze placement according to the gaze estimation model and the at least one characteristic vector comprises: deriving the coordinates of a placement on the X-axis and the Y-axis in the observation object coordinate system, by substituting the first characteristic vector, the second characteristic vector, and the third characteristic vector of a currently captured ocular image into the gaze estimation model for which the model parameters has been determined.

For another example, the method further comprises: performing a head movement compensation on the determined gaze placement, so as to obtain a compensated gaze placement.

For another example, the performing a head movement compensation on the determined gaze placement so as to obtain a compensated gaze placement comprises: determining a characteristic vector for head movement compensation according to the ocular image; determining a head movement compensation value according to the characteristic vector for head movement compensation; and adjusting the determined gaze placement based on the head movement compensation value, so as to obtain the compensated gaze placement.

For another example the characteristic vector for head movement compensation comprises at least one of following component values: a first component value indicating a back and forth movement of a head; a second component value indicating a horizontal movement of the head; and a third component value indicating a rotational movement of the head.

For another example, the first component value is a Euclidean distance between the center of the first reference speckle and the center of the second reference speckle, the second component value is a ratio between a major axis and a minor axis of an elliptically fitted pupil, and the third component value is a rotation angle of the major axis of the elliptically fitted pupil with respect to a horizontal direction. For another example, the determining a head movement compensation value according to the characteristic vector for head movement compensation comprises: inputting the characteristic vector for head movement compensation into a trained and support vector regression-based head vector compensation model, so as to determine corresponding head movement compensation values in the horizontal direction and a vertical direction.

According to a second aspect of the disclosure, there is provided a device for determining a gaze placement, comprising: a gaze characteristic vector determining unit, configured to determine at least one gaze characteristic vector based on an ocular image; and a gaze placement determining unit, configured to determine a gaze placement, according to a gaze estimation model and the at least one characteristic vector.

For example, the at least one characteristic vector comprises at least one of: a first characteristic vector indicating a vector from a center of a first reference speckle to a center of a pupil, wherein the first reference speckle is formed by a first reference source in the ocular image; a second characteristic vector indicating a vector from the center of the pupil to a center of a second reference speckle, wherein the second reference speckle is formed by a second reference source in the ocular image; and a third characteristic vector indicating a vector from the center of the second reference speckle to the center of the first reference speckle.

For another example, the gaze characteristic vector determining unit is further configured to fit a pupil portion of the ocular image into an ellipse, so as to determine at least one of: a center of the ellipse, being used as the center of the pupil; a major axis of the ellipse; a minor axis of the ellipse; and a rotation angle of the major axis with respect to a horizontal direction. For another example, the gaze estimation model is established by following formulas:

$$x_{fix} = a_0 + a_1 \cdot x_{AI} + a_2 \cdot x_{IB} + a_3 \cdot x_{BA} + a_4 \cdot x_{AI} \cdot x_{IB} + a_5 \cdot x_{AI} \cdot x_{BA} + a_6 \cdot x_{IB} \cdot x_{BA} + a_7 \cdot x_{AI}^2 + a_8 \cdot x_{IB}^2 + a_9 \cdot x_{BA}^2$$

$$y_{fix} = b_0 + b_1 \cdot y_{AI} + b_2 \cdot y_{IB} + b_3 \cdot y_{BA} + b_4 \cdot y_{AI} \cdot y_{IB} + b_5 \cdot y_{AI} \cdot y_{BA} + b_6 \cdot y_{IB} \cdot y_{BA} + b_7 \cdot y_{AI}^2 + b_8 \cdot y_{IB}^2 + b_9 \cdot y_{BA}^2$$

wherein $a_i$ and $b_j$ are model parameters, $i=0, \ldots, 9$ and $j=0, \ldots, 9$; $x_{fix}$ and $y_{fix}$ are coordinates of the gaze placement corresponding to the ocular image on the X-axis and the Y-axis of an observation object coordinate system respectively; $x_{AI}$ and $y_{AI}$ are components of the first characteristic vector on the X-axis and Y-axis of an ocular image coordinate system respectively; $x_{AI}$ and $y_{IB}$ are components of the second characteristic vector on the X-axis and Y-axis of the ocular image coordinate system respectively; and $x_{BA}$ and $y_{BA}$ are components of the third characteristic vector on the X-axis and Y-axis of the ocular image coordinate system respectively.

For another example, the gaze placement determining unit is further configured to derive the coordinates of the gaze placement of the subject on the X-axis and the Y-axis in the observation object coordinate system, by substituting the first characteristic vector, the second characteristic vector, and the third characteristic vector of a currently captured ocular image into the gaze estimation model for which the model parameters has been determined. For another example, the device further comprises a head movement compensating unit configured to perform a head movement compensation on a determined gaze placement, so as to obtain a compensated gaze placement. For another example, the head movement compensating unit is further configured to: determine a characteristic vector for head movement compensation according to the ocular image; determine a head movement compensation value according to the characteristic vector for head movement compensation; and adjust the determined gaze placement based on the head movement compensation value, so as to obtain the compensated gaze placement. For another example, the characteristic vector for head movement compensation comprises at least one of following component values: a first component value indicating a back and forth movement of a head; a second component value indicating a horizontal movement of the head; and a third component value indicating a rotational movement of the head. For another example, the first component value is a Euclidean distance between the center the first reference speckle and the center of the second reference speckle, the second component value is a ratio between a major axis and a minor axis of an elliptically fitted pupil, and the third component value is a rotation angle of the major axis of the elliptically fitted pupil with respect to a horizontal direction. For another example, the head movement compensating unit is further configured to input the characteristic vector for head movement compensation into a trained and support vector regression-based head vector compensation model, so as to determine corresponding head movement compensation values in the horizontal direction and a vertical direction.

According to a third aspect of the disclosure, there is provided a device for determining a gaze placement, comprising: a processor; and a memory having instructions stored thereon that, when executed by a processor, cause the processor to: determine at least one characteristic vector of the gaze based on an ocular image; and determine a gaze placement, according to a gaze estimation model and the at least one characteristic vector.

According to a fourth aspect of the disclosure, there is provided a computer readable storage medium having instructions stored thereon that, wherein when the instructions being executed by a processor, causing the processor to perform the method according to the first aspect of the disclosure.

BRIEF DESCRIPTION OF THE DRAWINGS

The above and additional objects, aspects and advantages of the embodiments of the present disclosure will become apparent and easily understood from the description of preferred embodiments of the disclosure in combination with the drawings, in which.

DETAILED DESCRIPTION

Figure 1:
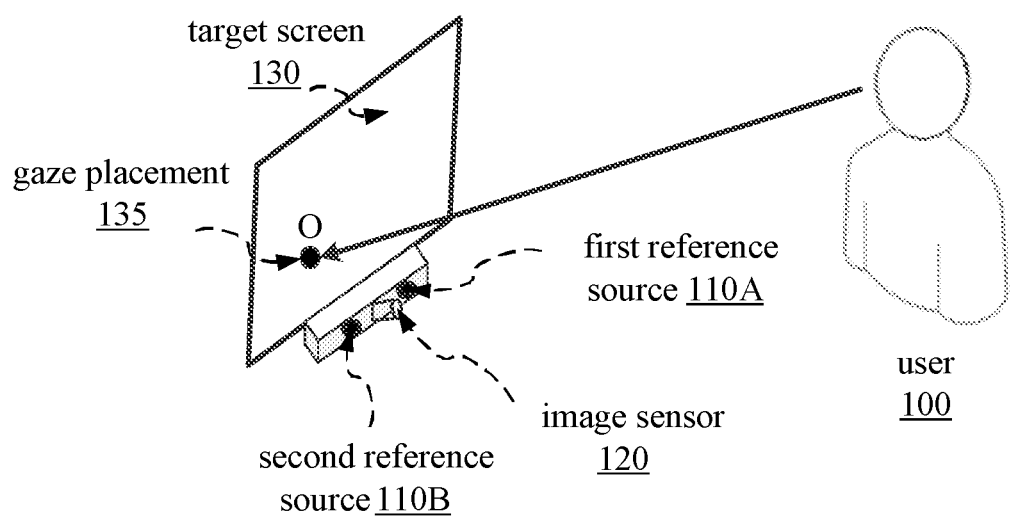
FIG. 1 shows a schematic diagram illustrating an exemplary application scenario for a solution of determining a gaze placement according to at least one embodiment of the present disclosure.

The embodiments of the present disclosure will be described in details with reference to the drawings. In the following description, in order to not obscure the understanding of the present disclosure, unnecessary details and functions for the present disclosure will not be discussed in details. In the disclosure, various embodiments described below are merely intended to exemplarily illustrate the principle of the disclosure, and should not be construed as limiting the scope of the disclosure. The embodiments of the present disclosure defined by the claims and their equivalents will be fully understood with reference to the following description in combination with the accompanying drawings. The description below includes numerous specific details to assist the understanding, but these details are considered to be merely exemplary. Accordingly, it will be apparent to those skilled in the art that various changes and modifications may be made to the embodiments described herein without departing from the scope and spirit of the disclosure. In addition, description of well-known functions and constructions are omitted for clarity and conciseness. Further, same reference numerals are used to indicate the same or similar functions and operations throughout the drawings. In addition, in the drawings, the respective parts are not necessarily drawn in scale. In other words, the relative sizes, lengths, and the like of the respective parts in the drawings are not necessarily drawn in an actual scale.

In the present disclosure, the terms "including", "comprising" and their derivatives are meant to be inclusive and not limiting. The term "or" is inclusive, meaning and/or. In addition, in the following description of the present disclosure, orientation terms, such as "upper", "lower", "left", "right", etc., are used to indicate relative positional relationships, so as to assist those skilled in the art in understanding the embodiments of the present disclosure. Thus, those skilled in the art should understand that "upper"/"lower" in one direction may become "lower"/"upper" in the opposite direction, and may become other positional relationship in the other direction, such as "left"/"right", etc.

Hereinafter, the present disclosure is described in detail by taking the present disclosure being applied to a human-computer interaction field as an example. However, the present disclosure is not limited thereto, and the present disclosure can also be applied to other fields such as augmented reality, virtual reality, user experience, psychological research, handicapped assistance, driver assistance, and the like. Further, although specific embodiments are described below by taking a human as an example, the present disclosure is not limited thereto. In fact, the present disclosure may also be applied to other animals or non-living entities having similar ocular features.

Gaze estimation technique may be divided into gaze estimation methods based on two-dimensional mapping model and gaze estimation methods based on three-dimensional eyeball model. The gaze estimation method based on two-dimensional mapping model can perform gaze parameter extraction and gaze feature recognition simply and rapidly, which can meet the practical requirements. However, the mapping model has a low precision and a poor stability, and also requires the user's head to be stationary when being used, which does not meet the comfort requirements. The gaze estimation method based on three-dimensional eyeball model can detect the position of the user's head and can adapt to the natural motion of the user's head, but it has a complicated hardware configuration (at least two cameras and two sources are required), a high hardware cost and a complicated algorithm. In addition, the gaze estimation method based on three-dimensional eyeball model needs to obtain independent information on the user's eye parameters, however, it is impossible to estimate the independent parameters in an indirect manner accurately without the aid of other instruments.

Due to the above problems in the gaze estimation technique, it is difficult to use a non-intrusive gaze estimation system widely. Therefore, there is a need for a gaze estimation system and method, which can meet the practical requirements with no complicated hardware configuration and a tolerance to the natural motion of the user's head, but is easier to implement than the conventional gaze estimation methods.

FIG. 1 shows a schematic diagram illustrating an exemplary application scenario 10 for a solution of determining a gaze placement according to at least one embodiment of the present disclosure. As shown in FIG. 1, the application scenario 10 may include a user 100, a target screen 120, a first reference source 110A and a second reference source 110B (hereinafter, sometimes referred to as reference source 110 when not specifically indicated), and an image sensor 120.

The principle for determining a gaze placement 135 (i.e., point O) of the user 100 on the target screen 130 is as follows. The reference light is emitted to the user 100 by the first reference source 110A and the second reference source 110B. Then, a reflection image including an ocular image of the user 100 is captured by the image sensor 120. By performing the aforementioned image capturing process on the user's eyes repeatedly while the user views a plurality of calibration points (sometimes referred to as reference points) on the target screen 130, ocular images comprising calibration points can be obtained. Further, based on calibration data associated with these calibration points (including, for example, respective gaze characteristic vectors determined from the ocular images, etc., which will be referred to hereinafter), model parameters of the gaze estimation model can be determined, thereby implementing gaze determination calibration. Next, the corresponding gaze placements on the target screen 130 can be determined based on the user 100's ocular image captured in real time. Hereinafter, the user 100 is also referred to as the "subject".

Although the use of two reference sources 110A and 110B is illustrated in FIG. 1, the present disclosure is not limited thereto. In fact, in some embodiments, a single reference source 110 or three or more reference sources 110 may also be used. According to the embodiments described in detail below, those skilled in the art can easily derive a scheme having other numbers of reference sources from the scheme having two reference sources.

Further, although the reference source is a ring-like reference source in FIG. 1, the present disclosure is not limited thereto. In fact, in some embodiments, reference sources having other shapes, such as triangle, square, rectangle, ellipse, hyperbolic shapes, or any other regular or irregular shape, may also be used.

Moreover, in order to not affect the user 100 viewing the target screen 130, in the embodiment shown in FIG. 1, both of the reference sources 110 use infrared light, such as infrared light with a wavelength of 850 nm. However, the disclosure is not limited thereto. In fact, in some embodiments, light with other wavelengths may also be employed. For example, in some embodiments, near-infrared light in the visible range can be employed. Although the near-infrared light is in visible range, it will not affect the viewing of the user significantly since it is in proximity to infrared light. In addition, light with any other wavelength can also be used.

Further, although the two reference sources 110 are respectively placed on the left and right sides of the image sensor 120 in FIG. 1, the present disclosure is not limited thereto. The two reference sources 110 can be placed at any relative positions of the image sensor 120, as long as the image sensor 120 can acquire the reference light which is emitted by the two reference sources 110 and reflected by the user's eye 100. Further, although the image sensor 120 (for example, a high definition camera) is located at a lower part of the target screen 130 in FIG. 1, the present disclosure is not limited thereto. In fact, image sensor 120 can be located at any suitable locations on target screen 130, such as on the left, right, upper, and the like.

Next, an exemplary scheme for determining a gaze placement according to at least one embodiment of the present disclosure will be described in detail with reference to FIG. 2 in conjunction with FIG. 1.

Figure 2:
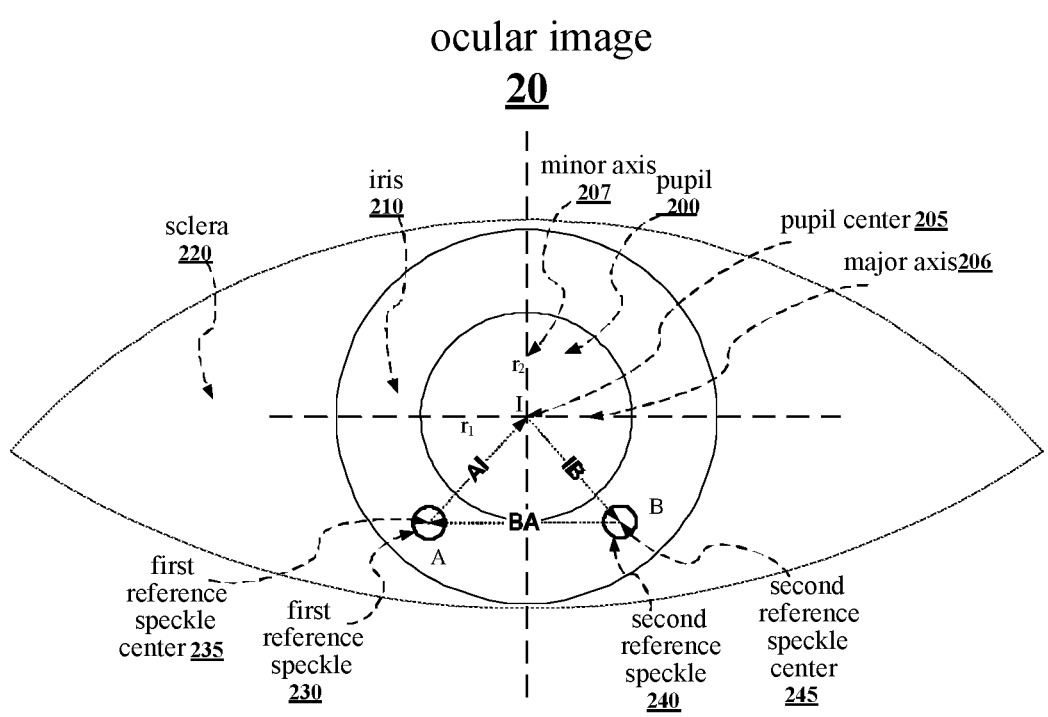
FIG. 2 shows a schematic diagram illustrating the determining of respective characteristic vectors of the gaze based on an ocular image according to at least one embodiment of the present disclosure.

FIG. 2 shows a schematic diagram illustrating the determining of respective characteristic vectors (for example, vectors $\vec{AI}$, $\vec{IB}$ and $\vec{BA}$) of the gaze based on an ocular image 20 according to at least one embodiment of the present disclosure. As shown in FIG. 2, the ocular image 20 comprises externally visible parts, including but not limited to: a pupil 200, an iris 210, and a sclera 220.

The iris 210 is a dark portion of the eye, wherein an opening is present in the middle, i.e., the pupil 200, so as to enable a light to enter the interior of the eye and to be perceived by photosensory cells on the retina and be imaged. The iris 210 is responsible for adjusting the size of the pupil 200 according to an intensity of ambient light, so as to enable the eye to adapt to different environments. For example, in a strong light environment, the iris 210 relaxes, which may cause the pupil 200 to contract, reducing the amount of incident light. Instead, in a low light environment, the iris 210 contracts, which may cause the pupil 200 to enlarge, increasing the amount of incident light.

The sclera 220 is a white portion of the eye, which is a rigid shell mainly composed of elastic fibers or the like and is responsible for protecting the eyeball. Furthermore, cornea is actually covered above the pupil 200, the iris 210 and the sclera 220. Since the cornea is transparent, it is not directly observable in the ocular image. However, in the embodiment of the present disclosure, since the reference light emitted by the two reference sources 110 is reflected when arriving at the cornea and reflective reference speckles are formed, for example, the first reference speckle 230 and the second reference speckle shown in FIG. 2, it is indicated that there is the cornea covered above the pupil 200, the iris 210 and the sclera 220.

Furthermore, the light emitted by the reference source 110 will be reflected on both of the front and rear surfaces of the cornea. Thus, each reference source 110 will form two speckles on the cornea. However, since the speckle formed on the rear surface has a brightness significantly lower than the speckle formed on the front surface and it is necessary to use an image sensor with a relatively high sensitivity and a relatively high resolution to observe the speckle formed on the rear surface thus, it is ignored in the embodiment shown in FIG. 1. However, it should be noted that embodiments of the present disclosure are also applied to the speckles formed on the rear surface, and those skilled in the art can readily derive similar solutions for the speckle formed on the rear surface in view of the embodiments described herein.

As shown in FIG. 2, the light emitted by the first reference source 110A and the second reference source 110B may form a first reference speckle 230 and a second reference speckle 240 on the cornea, respectively. Centers of the two reference speckles are referred as a first reference speckle center 235 (point A shown in FIG. 2) and a second reference speckle center 245 (point B shown in FIG. 2), respectively. In the present embodiment, the speckle center may be determined by fitting of the speckle area detected in the ocular image 20 into an ellipse or circle. Therefore, coordinates of the points A and B in the ocular image coordinate system can be determined, respectively, i.e., $A(x_A, y_A)$ and $B(x_B, y_B)$.

More specifically, a threshold for speckle binarization can be determined by using for example a histogram bimodal method. Then, an input pre-processed ocular image is binarized, so as to obtain a binarized speckle image. Next, the binarized speckle image can be corroded and expanded, and then median-filtered for secondary denoising, so as to obtain a speckle area image. Next, connected components extraction may be performed on the obtained speckle area image. Thus, the centroids of the extracted connected components of the two speckles are calculated, so as to obtain the first reflected speckle center $A(x_A, y_A)$ and the second reflected speckle center $B(x_B, y_B)$. In some embodiments, other methods may be used to determine the above reflected speckle information.

The position of the pupil 200 in the ocular image 20 can be determined before or after the determining of the speckle center, or at the same time. For example, the position of the pupil 200 in the ocular image 20 can be determined by using light pupil or dark pupil techniques. The light pupil means that the pupil is rendered in a bright state in the ocular image captured by the image sensor since the light emitted from the reference source is reflected at the fundus oculi and passes through the pupil (e.g., pupil 200) back to the image sensor, when the reference source (e.g., reference source 110) is on the same optical axis as the image sensor (e.g., image sensor 120). Similarly, the dark speckle means that the pupil is rendered in a dark state in the ocular image captured by the image sensor since the light does not reach the image sensor through the pupil after being reflected by the fundus oculi, when the reference source is not on the same optical axis as the image sensor 120. The position, range, and the like of the pupil 200 in the ocular image 20 can be determined irrespective of using the light pupil or the dark pupil. In the embodiment shown in FIG. 1, since the reference source 110 and the image sensor 120 are not on the same optical axis, the dark pupil is employed. However, the present disclosure is not limited thereto, the light pupil may also be employed.

Figure 5:
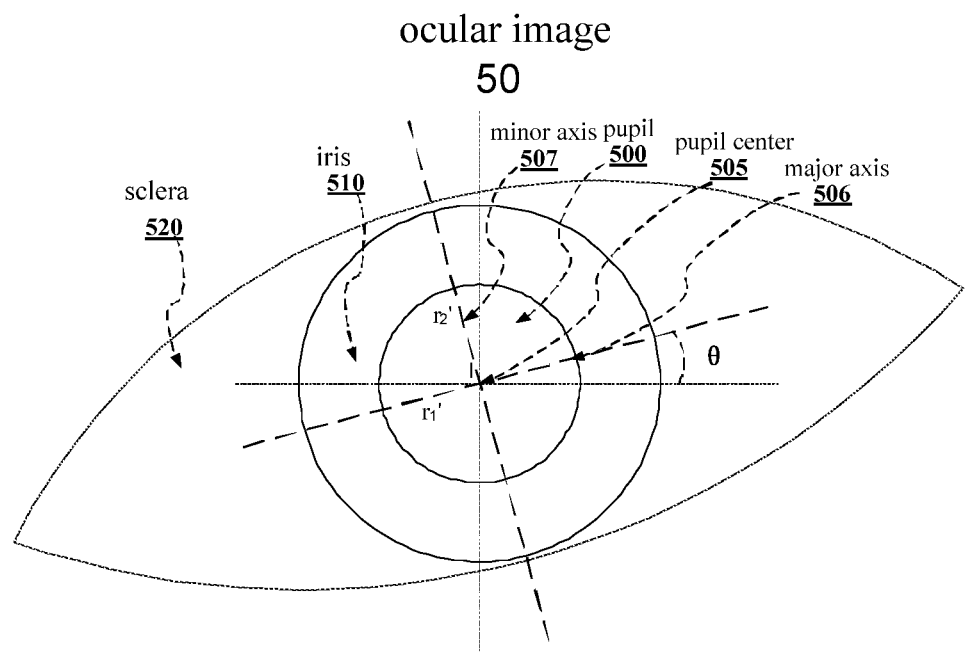
FIG. 5 shows a schematic diagram illustrating the determining of a vector for head movement compensation based on the ocular image according to at least one embodiment of the present disclosure.

When the ocular image 20 is obtained, the pupil center 205 (point I) 200 can be also determined, in addition to determining the centers A and B of the two reference speckles as previously described. For example, when the ocular image 20 with the dark pupil as described above is obtained, the threshold for pupil binarization can be determined by using image segmentation and/or the histogram bimodal method. Then, the pre-processed ocular image is binarized, so as to obtain a binarized pupil image. Then, the binarized pupil image is corroded and expanded, and then median-filtered for secondary denoising, so as to obtain a pupil area image. Next, edge detection may be performed on the obtained pupil area image, so as to obtain edge points. The obtained edge points are fitted into an ellipse as the pupil by using least square, so as to obtain pupil information. For example, the pupil information may comprise at least one of the center of the fitted ellipse (i.e., pupil center) $I(x_1,$ $y_1$); a major axis of the fitted ellipse $r_1$; a minor axis of the fitted ellipse $r_2$; and a rotation angle $\theta$ of the major axis with respect to a horizontal direction (as shown in FIG. 5). In some embodiments, other methods can be employed to determine the above mentioned pupil information.

In the embodiment shown in FIG. 2, although the major axis $r_1$ and the minor axis $r_2$ of the fitted ellipse are the horizontal axis and the vertical axis respectively, the present disclosure is not limited thereto. In fact, although the pupils are generally circular, they do not always have a wider length in the horizontal direction than in the vertical direction due to individual differences. In fact, the major axis $r_1$ and the minor axis $r_2$ may also be the vertical axis and the horizontal axis, respectively. Further, in the embodiment shown in FIG. 2, although there is no rotation angle between the major axis and the horizontal axis, however as shown in FIG. 5, when the head is deflected to one side, there may be a rotation angle between the horizontal axis and the major axis $r_1'$ of the pupil 500 in ocular image 50, that is, the rotation angle $\theta$.

It should be noted that not all of the above pupil information is required to determine the gaze placement 135 initially. For example, in the embodiment shown in FIG. 2, only the coordinates of the pupil center is required. Next, the operation of determining the respective gaze characteristic vectors based on the coordinates of the first reference speckle center 235 (point A), the second reference speckle center 245 (point B), and the pupil center 205 (point I) will be described in detail.

In the embodiment shown in FIG. 2, the first characteristic vector $\overrightarrow{AI}$ may be determined as a vector from a center of a first reference speckle $A(x_A, y_A)$ to a center of a pupil $I(x_I, y_I)$, i.e. $\overrightarrow{AI}=(x_{AI}, y_{AI})$ wherein $x_{AI}=x_I-x_A$, $y_{AI}=y_I-y_A$. In addition, the second characteristic vector $\overrightarrow{IB}$ may be determined as a vector from the center of the pupil $I(x_I, y_I)$ to a center of a second reference speckle $B(x_B, y_B)$, i.e. $\overrightarrow{IB}=(x_{IB}, y_{IB})$, wherein $x_{IB}=x_B-x_I$, $y_{IB}=y_B-y_I$. Furthermore, the third characteristic vector $\overrightarrow{BA}$ may be determined as a vector from the center of the second reference speckle $B(x_B, y_B)$ to the center of the first reference speckle $A(x_A, y_A)$, i.e. $\overrightarrow{BA}=(x_{BA}, y_{BA})$, wherein $x_{BA}=x_A-x_B$, $y_{BA}=y_A-y_B$. These three characteristic vectors satisfy equation (1):

$$\overrightarrow{AI}+\overrightarrow{IB}+\overrightarrow{BA}=0 \quad (1)$$

Therefore, as long as any two of the characteristic vectors are known, the third characteristic vector can be determined. For the convenience of description, all three characteristic vectors are used to illustrate the following operations. However, those skilled in the art should understand that these three characteristic vectors can be also expressed as two characteristic vectors.

Thereafter, as previously described in FIG. 1, the specific parameters of the gaze estimation model can be determined by using calibration points. In this embodiment, the established gaze estimation model is as follows:

$$x_{fix}=a_0+a_1 x_{AI}+a_2 x_{IB}+a_3 x_{BA}+a_4 x_{AI} x_{IB}+a_5 x_{AI} x_{BA}+a_6 x_{IB} x_{BA}+a_7 x_{AI}^2+a_8 x_{IB}^2+a_9 x_{BA}^2 \quad (2)$$

$$y_{fix}=b_0+b_1 y_{AI}+b_2 y_{IB}+b_3 y_{BA}+b_4 y_{AI} y_{IB}+b_5 y_{AI} y_{BA}+b_6 y_{IB} y_{BA}+b_7 y_{AI}^2+b_8 y_{IB}^2+b_9 y_{BA}^2 \quad (3)$$

wherein $(x_{fix}, y_{fix})$ are coordinates of the preset calibration point on target screen 130 respectively; $(x_{AI}, y_{AI})$ is the first characteristic vector $\overrightarrow{AI}$ obtained when the user is view corresponding calibration point; $(x_{AI}, y_{IB})$ is the second characteristic vector $\overrightarrow{IB}$ obtained when the user is view corresponding calibration point; and $(x_{BA}, y_{BA})$ is the third characteristic vector $\overrightarrow{BA}$ obtained when the user is view corresponding calibration point, and $a_0 \sim a_9$ and $b_0 \sim b_9$ are model parameters of the gaze estimation model. With respect to the gaze estimation model, the data of the plurality of calibration points can be fitted by using least square, so as to determine $a_0 \sim a_9$ and $b_0 \sim b_9$, thereby completing the calibration.

In the embodiment shown in FIG. 2, the above-described gaze estimation model can be calibrated by using 12 calibration points. However, the present disclosure is not limited thereto. In some embodiments, other suitable number of calibration points may also be used for calibration. For example, in some embodiments, 10 or more calibration points may be employed.

Next, after determining the various parameters of the gaze estimation model (i.e., after the device or system for determining a gaze placement has been calibrated), service stage can be initialized. In this stage, the image sensor 120 may acquire the ocular image 20 of the user 100, and derive the coordinates of gaze placement 135 of the subject on the X-axis and the Y-axis in the observation object coordinate system (for example, the coordinate system of the target screen 130), by determining corresponding characteristic vectors (such as, the first characteristic vector, the second characteristic vector, and the third characteristic vector) based on obtained information such as pupil center, respective reference speckle centers and the like, and substituting these characteristic vectors into equations (2) and (3) of the gaze estimation model for which the model parameters has been determined.

Thus, according to the embodiment shown in FIG. 2, it is possible to provide a gaze estimation scheme that is easy to implement and can meet practical requirements. The gaze estimation scheme according to the present disclosure may reduce the hardware configuration requirements. Specifically, the estimation of the user's gaze can be realized with a hardware configuration having one single camera and two infrared sources. Further, the above-described gaze estimation model has been constructed in a gaze estimation module used in the scheme according to the present disclosure, which can improve the accuracy of the gaze estimation scheme.

Since the head of the user 100 usually involuntarily shifts, rotates, etc. while he/she is observing, for example, the target screen 130 and it is difficult to be completely still, there is a deviation between the actual gaze placement of the user 100 and the gaze placement determined by the above-described gaze estimation scheme. In order to compensate for the deviation caused by the head movement, the coordinates $O(x_{fix}, y_{fix})$ obtained by the above-described scheme can be compensated by using the embodiment of FIGS. 3 to 5. Hereinafter, a compensation scheme for different types of head movements will be described in detail with reference to FIGS. 3 to 5.

Figure 3:
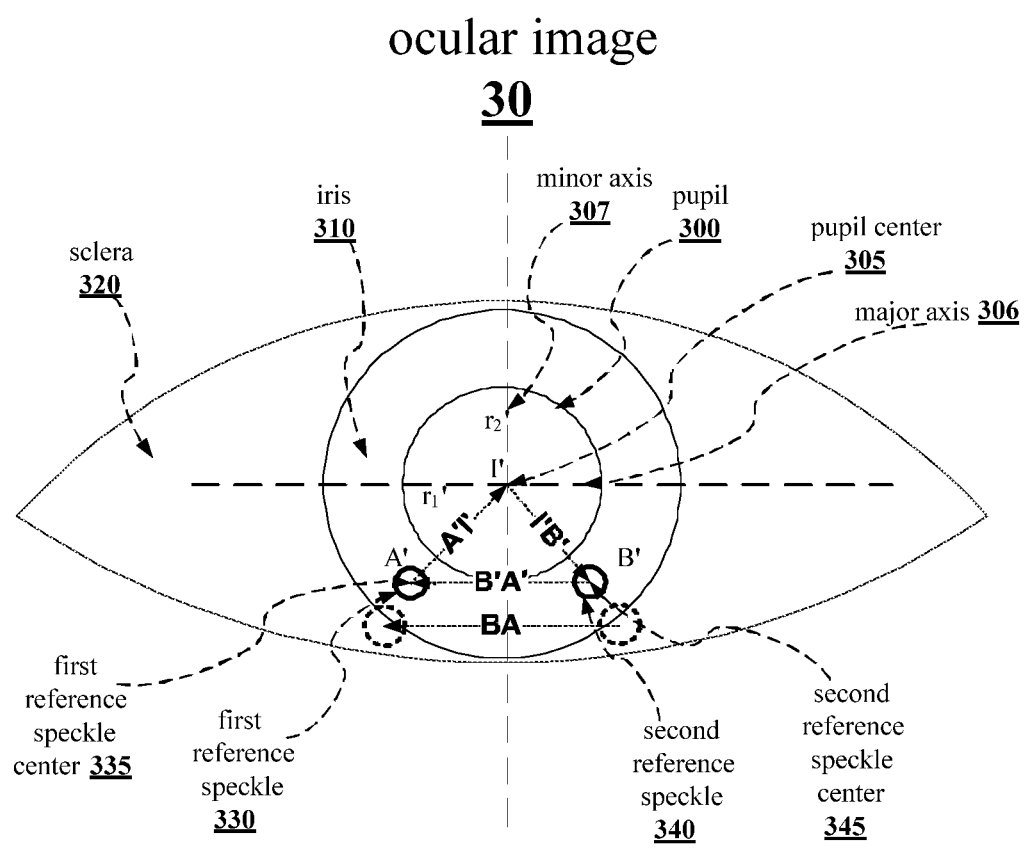
FIG. 3 shows a schematic diagram illustrating the determining of a vector for head movement compensation based on the ocular image according to at least one embodiment of the present disclosure.
Figure 4:
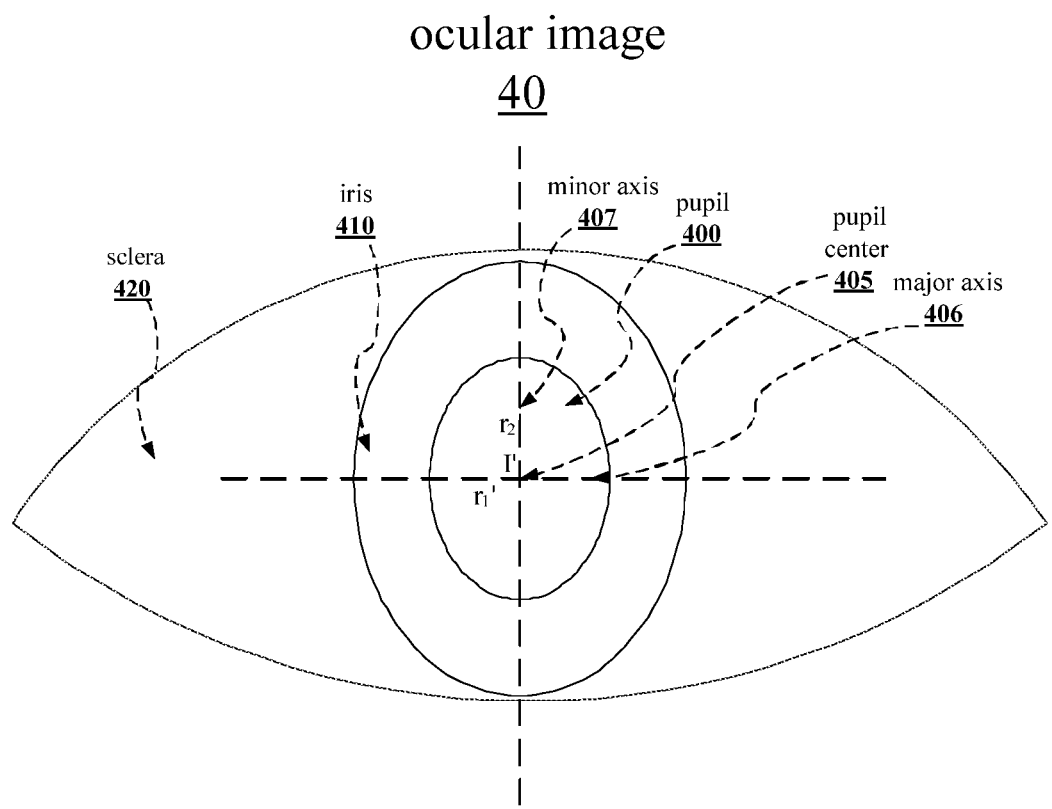
FIG. 4 shows a schematic diagram illustrating the determining of a vector for head movement compensation based on the ocular image according to at least one embodiment of the present disclosure.

FIG. 3 shows a schematic diagram illustrating the determining of a vector for head movement compensation based on the ocular image according to at least one embodiment of the present disclosure, in which the head of the user 100 moves back and forth in a direction perpendicular to a plane in which the target screen 130 is disposed. FIG. 4 shows a schematic diagram illustrating the determining of a vector for head movement compensation based on the ocular image according to some embodiment of the present disclosure, wherein the head of the user 100 moves right and left in a direction parallel to the plane in which the target screen 130 is disposed. FIG. 5 shows a schematic diagram illustrating the determining of a vector for head movement compensation based on the ocular image according to some embodiment of the present disclosure, wherein the head of the user 100 rotates in the plane parallel to the target screen 130. However, it should be noted that although FIGS. 3 to 5 show different types of head movements as described above, actual head movement may be any one or a combination of any of the three types of head movements. Therefore, in order to comprehensively consider these conditions, a support vector regression-based head vector compensation model described below can be used.

Firstly, the vector for head movement compensation is determined according to the ocular image (for example, the ocular images 30, 40, and/or 50). Then, the vector for head movement compensation is input into the support vector regression-based head vector compensation model discussed above, so as to determine corresponding head movement compensation values. Then, the coordinate of the determined gaze placement $O(x_{fix}, y_{fix})$ is adjusted based on the head movement compensation value.

As shown in FIG. 3, since the head of the user 100 moves back and forth in a direction perpendicular to the plane in which the target screen 130 is disposed, the Euclidean distance between the center of the first reference speckle 335 (i.e. point A) and the center of the second reference speckle (i.e. point B) in the ocular image 30 changes. More specifically, in the embodiment shown in FIG. 3, it can be seen that since the head of the user 100 moves in a direction away from the plane in which the target screen 130 is disposed, the third characteristic vector BA is shortened. It should be noted that the dotted circles are the gaze placements of the two reference speckles before the movement, and the distance between the centers is greater than the distance after the movement. Therefore, the first component value of the vector for the head movement compensation which indicates the back and forth movement of the head can be determined as the Euclidean distance between the centers of the two reference speckles. More specifically, the first component value L may be determined as the Euclidean distance between the center of the first reference speckle 335 (i.e. point A) and the center of the second reference speckle (i.e. point B):

$$L=\sqrt{(x_A-x_B)^2+(y_A-y_B)^2} \quad (4)$$

As shown in FIG. 4, since the head of the user 100 moves right and left in a horizontal direction of a plane parallel to the target screen 130, the major axis $r_1$ and the minor axis $r_2$ of the elliptical pupil fitted in the ocular image 40 change. More specifically, in the embodiment shown in FIG. 4, since the head of the user 100 moves in a direction away from the target screen 130 in the plane parallel to the target screen 130, the major axis and the minor axis of the fitted elliptical pupil change, so that the original major axis $r_1$ becomes the minor axis $r_1'$ eventually. In other word, although the major axis and the minor axis are both shortened, the major axis is shortened much more significantly due to the head movement in the major axis. Thus, a ratio between a major axis and a minor axis of an elliptically fitted pupil will change. Therefore, the second component value μ of the vector for the head movement compensation which indicates the horizontal movement of the head can be determined as a ratio between the major axis $r_1$ and the minor axis $r_2$ of an elliptically fitted pupil, i.e. $\mu=r_1/r_2$, indicating a translation movement of the head in a horizontal direction of a plane parallel to the target screen 130.

Further, as shown in FIG. 5, since the head of the user 100 rotates in the plane parallel to the target screen 130, the major axis $r_1$ of the elliptically fitted pupil in the ocular image 50 rotates with respect to a horizontal axis, forming a rotation angle. Therefore, the third component value θ which indicates the rotation movement of the head can be determined as the rotation angle θ of the major axis $r_1$ of the ellipse of the rotation movement in the plane parallel to the target screen 130 with respect to the horizontal axis.

All or a part of the above respective component values may be obtained according to the pupil information determined in conjunction with FIG. 2. Therefore, in practical applications, in a process for head movement compensation, it is not necessary to calculate these component values again.

After determining the vector for head movement compensation $C_{gaze}=(L, \mu, \theta)$, the vector for head movement compensation can be input into a trained and support vector regression-based head vector compensation model, so as to determine corresponding head movement compensation values in the horizontal direction and a vertical direction $(x_{horizontal}, y_{vertical})$. Then, based on the calculated head movement compensation value $(x_{horizontal}, y_{vertical})$, the position of the aforementioned determined gaze placement can be adjusted. More specifically, the calculated head movement compensation value $(x_{horizontal}, y_{vertical})$ may be added with the previously determined gaze placement $O(x_{fix}, y_{fix})$, thereby obtaining the final gaze placement $F(x_{fix}, y_{fix})$ of the user 100 on the target screen 130, wherein $X_{fix}=x_{fix}+x_{horizontal}$ and $Y_{fix}=y_{fix}+y_{horizontal}$.

Therefore, by using the support vector regression-based head movement compensation model, the deviation due to the user's head movement can be easily compensated, thereby enhancing the anti-head movement capability of the gaze estimation system and method, allowing the user's head to move naturally when using the system, alleviating the requirement on the user's head of conventional gaze estimation system, and improving the comfort and naturalness of the gaze estimation system.

Figure 6:
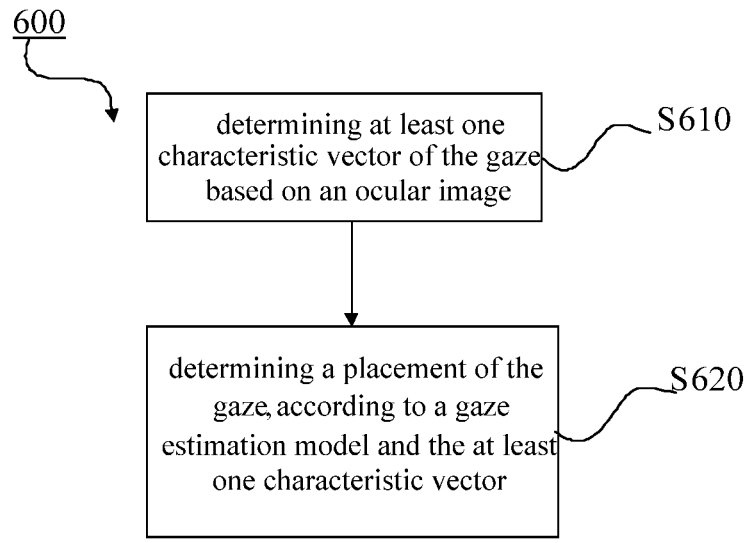
FIG. 6 shows a flow chart illustrating a method for determining a gaze placement according to at least one embodiment of the present disclosure.

FIG. 6 shows a flow chart illustrating a method 600 for determining a gaze placement according to at least one embodiment of the present disclosure. As shown in FIG. 6, the method 600 can include steps S610 and S620. In accordance with the present disclosure, some of the steps of the method 600 may be performed separately or in combination, and may be performed in parallel or sequentially, and is not limited to the specific order of operations illustrated in FIG. 6. In some embodiments, the method 600 can be performed by the device 700 shown in FIG. 7 or the device 800 shown in FIG. 8.

Figure 7:
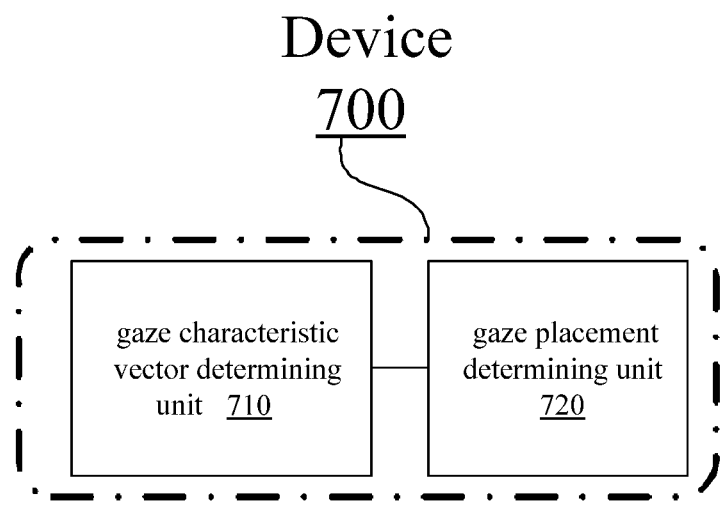
FIG. 7 shows a functional block diagram illustrating a device for performing the method of FIG. 6 according to at least one embodiment of the present disclosure.

FIG. 7 shows a functional block diagram illustrating a device 700 for determining a gaze according to at least one embodiment of the present disclosure. As shown in FIG. 7, the device 700 may include a gaze characteristic vector determining unit 710 and a gaze placement determining unit 720.

The gaze characteristic vector determining unit 710 may be configured to determine at least one gaze characteristic vector based on an ocular image. The gaze characteristic vector determining unit 710 may be a central processing unit (CPU), a digital signal processor (DSP), a microprocessor, a microcontroller, etc. of the device 700, which may be incorporated with an image sensor (e.g., an infrared camera, a visible light camera, a camera, etc.) and/or a communication component (for example, an Ethernet card, a WiFi chip, an RF chip, etc.) of the device 700. The gaze characteristic vector determining unit 710 may determine the at least one gaze characteristic vector according to the ocular image captured by the image sensor or the ocular image received from a remote device through the communication component.

The gaze placement determining unit 720 can be configured to determine a gaze placement, according to the gaze estimation model and the at least one characteristic vector. The gaze placement determining unit 720 can also be a central processing unit (CPU), digital signal processor (DSP), microprocessor, microcontroller, etc. of the device 700, which can determine the gaze placement based on a pre-trained and/or real-time training gaze estimation model and the at least one gaze characteristic vector determined by the gaze characteristic vector determining unit 710.

In addition, the device 700 may also comprise other units not shown in FIG. 7, such as a head movement compensation unit or the like. In some embodiments, the head movement compensation unit can be configured to perform a head movement compensation on a determined gaze placement, so as to obtain a compensated gaze placement. In some embodiments, the head movement compensating unit is further configured to: determine a characteristic vector for head movement compensation according to the ocular image; determine a head movement compensation value according to the characteristic vector for head movement compensation; and adjust the determined gaze placement based on the head movement compensation value, so as to obtain the compensated gaze placement. In some embodiments, the head movement compensating unit is further configured to input the characteristic vector for head movement compensation into a trained and support vector regression-based head vector compensation model, so as to determine corresponding head movement compensation values in the horizontal direction and a vertical direction.

In addition, the device 700 may also comprise other functional units not shown in FIG. 7, such as, a bus, a memory, a power supply, an antenna, a communication component or a storage device. However, they do not affect the understanding of the principles of the present application, and thus the detailed descriptions thereof are omitted herein.

The method 600 for determining the gaze which is performed by the device 700 in accordance with at least one embodiment of the present disclosure will be described in detail below with reference to FIGS. 6 and 7.

The method 600 begins at a step S610, in which at least one characteristic vector of the gaze is determined by the gaze characteristic vector determining unit 710 based on the ocular image.

In step S620, the gaze placement is determined by the gaze placement determining unit 720 of the device 700, based on the gaze estimation model and the at least one characteristic vector.

In some embodiments, the at least one characteristic vector comprises at least one of: the first characteristic vector indicating the vector from the center of the first reference speckle to the center of the pupil, wherein $x_{AI}$ and $y_{AI}$ are components of the first characteristic vector on the X-axis and Y-axis of an ocular image coordinate system respectively; the second characteristic vector indicating the vector from the center of the pupil to the center of the second reference speckle, wherein $x_{IB}$ and $y_{IB}$ are components of the second characteristic vector on the X-axis and Y-axis of the ocular image coordinate system respectively; and the third characteristic vector indicating the vector from the center of the second reference speckle to the center of the first reference speckle, wherein $x_{BA}$ and $y_{BA}$ are components of the third characteristic vector on the X-axis and Y-axis of the ocular image coordinate system respectively.

In some embodiments, the determining the at least one characteristic vector of the gaze based on the ocular image comprises: fitting a pupil portion of the ocular image into an ellipse, so as to determine at least one of: a center of the ellipse, being used as the center of the pupil; a major axis of the ellipse; a minor axis of the ellipse; and a rotation angle of the major axis with respect to a horizontal direction. In some embodiments, the ocular image is obtained by using a ring-like reference source as an illumination source. In some embodiments, the gaze estimation model is established by following formulas:

$$x_{fix}=a_0+a_1 x_{AI}+a_2 x_{IB}+a_3 x_{BA}+a_4 x_{AI} x_{IB}+a_5 x_{AI} x_{BA}+a_6 x_{IB} x_{BA}+a_7 x_{AI}^2+a_8 x_{IB}^2+a_9 x_{BA}^2$$

$$y_{fix}=b_0+b_1 y_{AI}+b_2 y_{IB}+b_3 y_{BA}+b_4 y_{AI} y_{IB}+b_5 y_{AI} y_{BA}+b_6 y_{IB} y_{BA}+b_7 y_{AI}^2+b_8 y_{IB}^2+b_9 y_{BA}^2$$

wherein $a_i$ and $b_j$ are model parameters, $i=0, \ldots, 9$ and $j=0, \ldots, 9$; $x_{fix}$ and $y_{fix}$ are coordinates of the gaze placement for the ocular image of the subject 100 on the X-axis and the Y-axis of an observation object coordinate system respectively. In some embodiments, the model parameters of the gaze estimation model are determined by using least squares, and at least 10 calibration points are used. In some embodiments, the determining the gaze placement according to the gaze estimation model and the at least one characteristic vector comprises: deriving the coordinates of a placement on the X-axis and the Y-axis in the observation object coordinate system, by substituting the first characteristic vector, the second characteristic vector, and the third characteristic vector of a currently captured ocular image into the gaze estimation model for which the model parameters has been determined.

In some embodiments, the method further comprises: performing a head movement compensation on the determined gaze placement, so as to obtain a compensated gaze placement. In some embodiments, the performing a head movement compensation on the determined gaze placement so as to obtain a compensated gaze placement comprises: determining a characteristic vector for head movement compensation according to the ocular image; determining a head movement compensation value according to the characteristic vector for head movement compensation; and adjusting the determined gaze placement based on the head movement compensation value, so as to obtain the compensated gaze placement. In some embodiments, the characteristic vector for head movement compensation comprises at least one of following component values: a first component value indicating a back and forth movement of a head; a second component value indicating a horizontal movement of the head; and a third component value indicating a rotational movement of the head. In some embodiments, the first component value is a Euclidean distance between the center of the first reference speckle and the center of the second reference speckle, the second component value is a ratio between a major axis and a minor axis of an elliptically fitted pupil, and the third component value is a rotation angle of the major axis of the elliptically fitted pupil with respect to a horizontal direction. In some embodiments, the determining a head movement compensation value according to the characteristic vector for head movement compensation comprises: inputting the characteristic vector for head movement compensation into a trained and support vector regression-based head vector compensation model, so as to determine corresponding head movement compensation values in the horizontal direction and a vertical direction.

Figure 8:
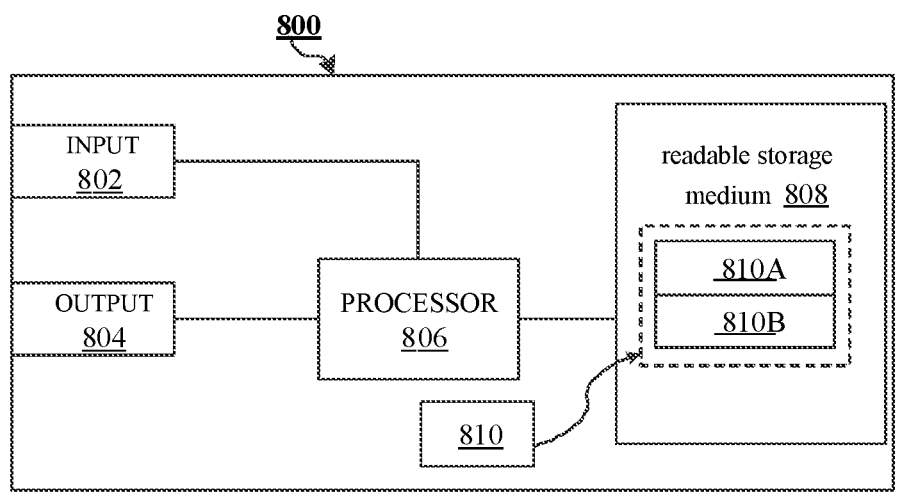
FIG. 8 shows a hardware layout diagram illustrating a device for determining a gaze placement according to at least one embodiment of the present disclosure.

FIG. 8 shows a diagram illustrating a hardware layout 800 of the device 700 shown in FIG. 7 according to at least one embodiment of the present disclosure. The hardware layout 800 comprises a processor 806 (e.g., a digital signal processor (DSP)). The processor 806 can be a single processing unit or a plurality of processing units for performing different steps of the method described herein. The hardware layout 800 can also comprise an inputting unit 802 for receiving signals from other entities, and an outputting unit 804 for providing signals to other entities. The inputting unit 802 and outputting unit 804 can be arranged as a single entity or as separate entities.

Moreover, the hardware layout 800 can comprise at least one readable storage medium 808 in the form of a non-volatile or volatile memory, such as an electrically erasable programmable read only memory (EEPROM), a flash memory, and/or a hard drive. The readable storage medium 808 comprises a computer program 810 that includes code/computer readable instructions that, when executed by the processor 806 in the hardware layout 800, cause the hardware layout 800 and/or the device 700 including the hardware layout 800 to perform the method as described above in connection with FIGS. 1-6, and any variations thereof.

The computer program 810 can be configured as computer program codes with an architecture having computer program modules 810A-810B, Accordingly, in an example embodiment in which the device 700 uses the hardware layout 800, the code in the computer program of the hardware layout 800 comprises a module 810A for determining at least one gaze characteristic vector according to the ocular image. The code in the computer program further comprises a module 810B for determining a gaze placement according to a gaze estimation model and the at least one characteristic vector.

The computer program module can substantially perform the various steps in the method illustrated in FIGS. 1-6, to simulate the device 700. In other words, when different computer program modules are executed in processor 806, they may correspond to the different units described above in device 700.

Although code means in the embodiment disclosed above with reference to FIG. 8 is implemented as a computer program module that, when executed by the processor 806, cause hardware layout 800 to perform the steps described above in connection with FIGS. 1-6, however, in alternative implementations, at least one of the code means can be at least partially implemented as a hardware circuit.

The processor may be a single CPU (Central Processing Unit), but may also include two or more processing units. For example, the processor can include a general purpose microprocessor, an instruction set processor, and/or a set of related chips and/or a special purpose microprocessor (e.g., an application-specific integrated circuit (ASIC)). The processor may also include an onboard memory for caching. The computer program can be carried by a computer program product connected to the processor. The computer program product can comprise a computer readable medium having computer programs stored thereon. For example, the computer program product can be a flash memory, a random access memory (RAM), a read only memory (ROM), an EEPROM, and the like. The abovementioned computer program modules can be distributed to different computer program products in the form of UE onboard memory in alternative embodiments.

The present disclosure has been described in connection with the embodiments. It will be appreciated that various changes, substitutions and additions may be made by those skilled in the art without departing from the spirit and scope of the disclosure. Therefore, the scope of the present disclosure is not limited to the specific embodiments described above, but is defined by the appended claims.

Furthermore, the functions described herein as being implemented by pure hardware, software, and/or firmware may also be implemented by means of dedicated hardware, a combination of general-purpose hardware and software, and the like. For example, the functions described as being implemented by dedicated hardware (e.g., Field Programmable Gate Array (FPGA), Application Specific Integrated Circuit (ASIC), etc.) may also be implemented by general-purpose hardware (e.g., central processing unit (CPU), digital signal processing (DSP), etc.) in combination with software, and vice versa.

We claim:

1. A method for determining a gaze placement of a subject, comprising:
    obtaining an ocular image of the subject
    determining at least one gaze characteristic vector based on the ocular image; and
    determining the gaze placement of the subject, according to a gaze estimation model and the at least one gaze characteristic vector,
    wherein the at least one gaze characteristic vector comprises:
        a first characteristic vector indicating a vector from a center of a first reference speckle to a center of a pupil, wherein the first reference speckle is formed by a first reference source in the ocular image;
        a second characteristic vector indicating a vector from the center of the pupil to a center of a second reference speckle, wherein the second reference speckle is formed by a second reference source in the ocular image; and
        a third characteristic vector indicating a vector from the center of the second reference speckle to the center of the first reference speckle; and
    wherein the gaze estimation model is expressed as:

$$x_{fix}=a_0+a_1 \cdot x_{AI}+a_2 \cdot x_{IB}+a_3 \cdot x_{BA}+a_4 \cdot x_{AI} \cdot x_{IB}+a_5 \cdot x_{AI} \cdot x_{BA}+ a_6 \cdot x_{IB} \cdot x_{BA}+a_7 \cdot x_{AI}^2+a_8 \cdot x_{IB}^2+a_9 \cdot x_{BA}^2$$

$$y_{fix}=b_0+b_1 \cdot y_{AI}+b_2 \cdot y_{IB}+b_3 \cdot y_{BA}+b_4 \cdot y_{AI} \cdot y_{IB}+b_5 \cdot y_{AI} \cdot y_{BA}+ b_6 \cdot y_{IB} \cdot y_{BA}+b_7 \cdot y_{AI}^2+b_8 \cdot y_{IB}^2+b_9 \cdot y_{BA}^2$$

wherein $a_i$ and $b_j$ are model parameters, i=0. . . , 9 and j=0, . . . , 9; and $x_{fix}$ and $y_{fix}$ are coordinates of a gaze placement corresponding to the ocular image on the X-axis and the Y-axis of an observation object coordinate system respectively; $x_{AI}$ and $y_{AI}$ are components of the first characteristic vector on the X-axis and Y-axis of an ocular image coordinate system respectively; $x_{IB}$ and $y_{IB}$ are components of the second characteristic vector on the X-axis and Y-axis of the ocular image coordinate system respectively; and $x_{BA}$ and $y_{BA}$ are components of the third characteristic vector on the X-axis and Y-axis of the ocular image coordinate system respectively.

2. The method of claim 1, wherein the determining the at least one gaze characteristic vector based on the ocular image comprises: fitting a pupil portion of the ocular image into an ellipse, so as to determine at least one of:
    a center of the ellipse, being used as the center of the pupil;

a major axis of the ellipse;
a minor axis of the ellipse; and
a rotation angle of the major axis with respect to a horizontal direction.

3. The method of claim 1, further comprising obtaining the ocular image by using a ring-like reference source as an illumination source.

4. The method of claim 1, wherein the determining the gaze placement of the subject according to the gaze estimation model and the at least one gaze characteristic vector comprises:
deriving the coordinates of a placement on the X-axis and the Y-axis in the observation object coordinate system, by substituting the first characteristic vector, the second characteristic vector, and the third characteristic vector of a currently captured ocular image into the gaze estimation model for which the model parameters have been determined.

5. The method of claim 1, further comprising:
performing a head movement compensation on a determined gaze placement of the subject, so as to obtain a compensated gaze placement.

6. The method of claim 5 wherein the performing a head movement compensation on a determined gaze placement of the subject so as to obtain a compensated gaze placement comprises:
determining a characteristic vector for head movement compensation according to the ocular image;
determining a head movement compensation value according to the characteristic vector for head movement compensation; and
adjusting the determined gaze placement of the subject based on the head movement compensation value, so as to obtain the compensated gaze placement.

7. The method of claim 6, wherein the characteristic vector for head movement compensation comprises at least one of following component values:
a first component value indicating a back and forth movement of a head;
a second component value indicating a horizontal movement of the head; and
a third component value indicating a rotational movement of the head.

8. The method of claim 7, wherein the first component value is a Euclidean distance between the center of the first reference speckle and the center of the second reference speckle, the second component value is a ratio between a major axis and a minor axis of an elliptically fitted pupil, and the third component value is a rotation angle of the major axis of the elliptically fitted pupil with respect to a horizontal direction.

9. The method of claim 7, wherein the determining a head movement compensation value according to the characteristic vector for head movement compensation comprises:
inputting the characteristic vector for head movement compensation into a trained and support vector regression-based head vector compensation model, so as to determine head movement compensation values in the horizontal direction and a vertical direction respectively.

10. A computer readable storage medium having instructions stored thereon that, wherein when the instructions being executed by a processor, causing the processor to perform the method of claim 1.

11. A device for determining a gaze placement, comprising:

a gaze characteristic vector determining unit, configured to determine at least one gaze characteristic vector of the gaze based on an ocular image; and
a gaze placement determining unit, configured to determine the gaze placement, according to a gaze estimation model and the at least one gaze characteristic vector,
wherein the at least one gaze characteristic vector comprises:
a first characteristic vector indicating a vector from a center of a first reference speckle to a center of a pupil, wherein the first reference speckle is formed by a first reference source in the ocular image;
a second characteristic vector indicating a vector from the center of the pupil to a center of a second reference speckle, wherein the second reference speckle is formed by a second reference source in the ocular image; and
a third characteristic vector indicating a vector from the center of the second reference speckle to the center of the first reference speckle; and
wherein the gaze estimation model is established by following formulas:

$$x_{fix}=a_0+a_1 \cdot x_{AI}+a_2 \cdot x_{IB}+a_3 \cdot x_{BA}+a_4 \cdot x_{AI} \cdot x_{IB}+a_5 \cdot x_{AI} \cdot x_{BA}+ a_6 \cdot x_{IB} \cdot x_{BA}+a_7 \cdot x_{AI}^2+a_8 \cdot x_{IB}^2+a_9 \cdot x_{BA}^2$$

$$y_{fix}=b_0+b_1 \cdot y_{AI}+b_2 \cdot y_{IB}+b_3 \cdot y_{BA}+b_4 \cdot y_{AI} \cdot y_{IB}+b_5 \cdot y_{AI} \cdot y_{BA}+ b_6 \cdot y_{IB} \cdot y_{BA}+b_7 \cdot y_{AI}^2+b_8 \cdot y_{IB}^2+b_9 \cdot y_{BA}^2$$

wherein $a_i$ and $b_j$ are model parameters, i=0, ..., 9 and j=0, ..., 9; and $x_{fix}$ and $y_{fix}$ are coordinates of a gaze placement corresponding to the ocular image on the X-axis and the Y-axis of an observation object coordinate system respectively; $x_{AI}$ and $y_{AI}$ are components of the first characteristic vector on the X-axis and Y-axis of an ocular image coordinate system respectively; $x_{IB}$ and $y_{IB}$ are components of the second characteristic vector on the X-axis and Y-axis of the ocular image coordinate system respectively; and $x_{BA}$ and $y_{BA}$ are components of the third characteristic vector on the X-axis and Y-axis of the ocular image coordinate system respectively.

12. The device of claim 11, wherein the gaze characteristic vector determining unit is further configured to fit a pupil portion of the ocular image into an ellipse, so as to determine at least one of:
a center of the ellipse, being used as the center of the pupil;
a major axis of the ellipse; a minor axis of the ellipse; and
a rotation angle of the major axis with respect to a horizontal direction.

13. A device for determining a gaze placement, comprising:
a processor; and
a memory having instructions stored thereon that, the processor executes the instructions to:
determine at least one gaze characteristic vector based on an ocular image; and
determine the gaze placement, according to a gaze estimation model and the at least one gaze characteristic vector,
wherein the at least one gaze characteristic vector comprises:
a first characteristic vector indicating a vector from a center of a first reference speckle to a center of a pupil, wherein the first reference speckle is formed by a first reference source in the ocular image;

a second characteristic vector indicating a vector from the center of the pupil to a center of a second reference speckle, wherein the second reference speckle is formed by a second reference source in the ocular image; and a third characteristic vector indicating a vector from the center of the second reference speckle to the center of the first reference speckle; and wherein the gaze estimation model is expressed as:

$$x_{fix}=a_0+a_1 x_{AI}+a_2 x_{IB}+a_3 x_{BA}+a_4 x_{AI} x_{IB}+a_5 x_{AI} x_{BA}+a_6 x_{IB} x_{BA}+a_7 x_{AI}^2+a_8 x_{IB}^2+a_9 x_{BA}^2$$

$$y_{fix}=b_0+b_1 y_{AI}+b_2 y_{IB}+b_3 y_{BA}+b_4 y_{AI} y_{IB}+b_5 y_{AI} y_{BA}+b_6 y_{IB} y_{BA}+b_7 y_{AI}^2+b_8 y_{IB}^2+b_9 y_{BA}^2$$

wherein $a_i$ and $b_j$ are model parameters, $i=0,\ldots,9$ and $j=0,\ldots,9$; and $x_{fix}$ and $y_{fix}$ are coordinates of a gaze placement corresponding to the ocular image on the X-axis and the Y-axis of an observation object coordinate system respectively; $x_{AI}$ and $y_{AI}$ are components of the first characteristic vector on the X-axis and Y-axis of an ocular image coordinate system respectively; $x_{IB}$ and $y_{IB}$ are components of the second characteristic vector on the X-axis and Y-axis of the ocular image coordinate system respectively; and $x_{BA}$ and $y_{BA}$ are components of the third characteristic vector on the X-axis and Y-axis of the ocular image coordinate system respectively.

14. The device of claim 13, wherein the processor executes the instructions to:

determine a characteristic vector for head movement compensation according to the ocular image;

determine a head movement compensation value according to the characteristic vector for head movement compensation; and adjust a determined gaze placement based on the head movement compensation value, so as to obtain a compensated gaze placement.

15. The device of claim 14, wherein the characteristic vector for head movement compensation comprises at least one of following component values:

a first component value indicating a back and forth movement of a head;

a second component value indicating a horizontal movement of the head; and a third component value indicating a rotational movement of the head.

16. The device of claim 15, wherein the first component value is a Euclidean distance between the center the first reference speckle and the center of the second reference speckle, the second component value is a ratio between a major axis and a minor axis of an elliptically fitted pupil, and the third component value is a rotation angle of the major axis of the elliptically fitted pupil with respect to a horizontal direction.

* * * * *